United States Patent [19]

Nakano

[11] 4,393,453
[45] Jul. 12, 1983

[54] REGION INFORMATION PROCESSING SYSTEM

[76] Inventor: Akira Nakano, 13-13, Mita 2-Chome, Meguro-ku, Tokyo-to, Japan

[21] Appl. No.: 258,276

[22] Filed: Apr. 28, 1981

Related U.S. Application Data

[63] Continuation-in-part of Ser. No. 45,261, Jun. 4, 1979, abandoned, which is a continuation-in-part of Ser. No. 915,185, Jun. 14, 1978, abandoned.

[30] Foreign Application Priority Data

Jun. 20, 1977 [JP] Japan .................................. 52-72978

[51] Int. Cl.$^3$ ............................................ G06F 15/20
[52] U.S. Cl. .................... 364/514; 340/723; 382/41; 382/49
[58] Field of Search ................. 364/515, 518; 340/723

[56] References Cited

U.S. PATENT DOCUMENTS

| | | | |
|---|---|---|---|
| 3,976,982 | 8/1976 | Eiselen | 364/515 X |
| 4,001,787 | 1/1977 | Kimmel | 364/515 X |
| 4,060,713 | 11/1977 | Golay | 364/515 X |
| 4,261,040 | 4/1981 | Weidman et al. | 364/515 X |
| 4,267,573 | 5/1981 | Chaikin et al. | 364/515 |
| 4,271,476 | 6/1981 | Lotspiech | 364/515 |

OTHER PUBLICATIONS

Sutherland et al., "A Characterization of Ten Hidden-Surface Algorithms", copyright 1974, *Association for Computing Machinery.*
Freeman, "Computer Processing of Line-Drawing Images", copyright 1974, *Association for Computing Machinery.*

*Primary Examiner*—David H. Malzahn
*Attorney, Agent, or Firm*—Wenderoth, Lind & Ponack

[57] ABSTRACT

A region information processing system processes information concerning a plurality of objective regions in a field to produce information concerning a synthetic region to be formed by synthesizing the information concerning the objective regions. The information concerning each of the objective regions is provided by external region information source. The region information processing system comprising:

A subfield designating device sequentially designates subfields each constituting part of the field, by providing, one at a time, subfield designating data.

A plurality of surveying devices are each associated with a corresponding one of the regions and are each responsive to the subfield designating data for examining the region information source to produce local data of the subfield being designated concerning the associated region, the local data including at least region flag data indicating whether or not the subfield is inside the boundary of the associated region.

A synthesizing device is responsive to the local data of the subfield concerning the objective regions for judging whether or not the local data of the subfield concerning the objective regions satisfy a predetermined condition to produce, depending on the result of the judgement, region flag data indicating whether or not the subfield being designated is inside the synthetic region.

11 Claims, 16 Drawing Figures

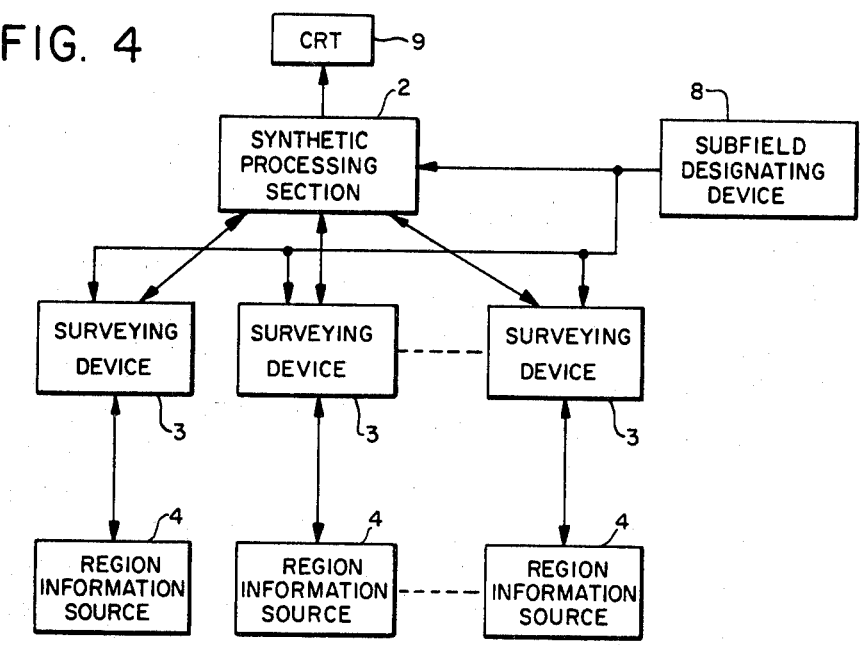
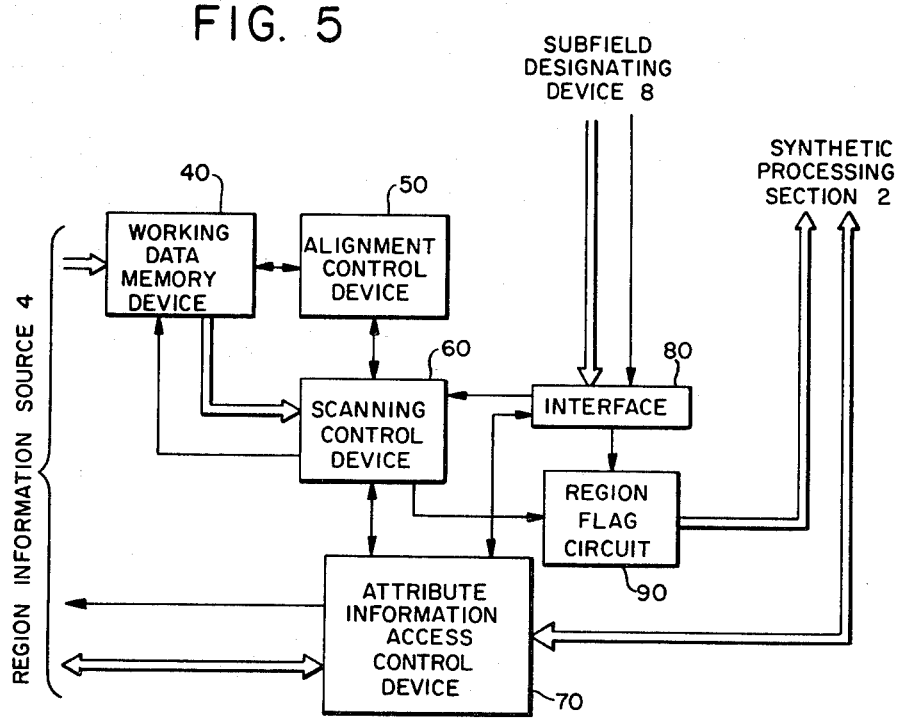

F I G. 12
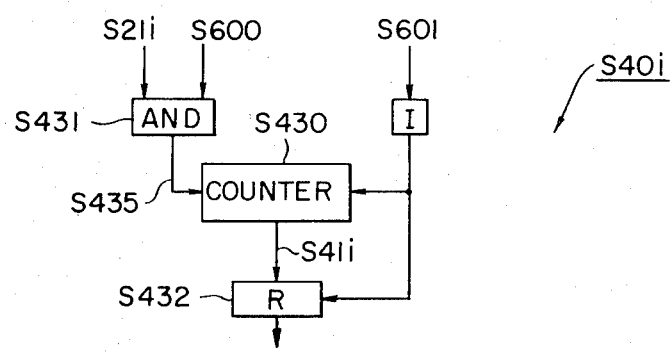

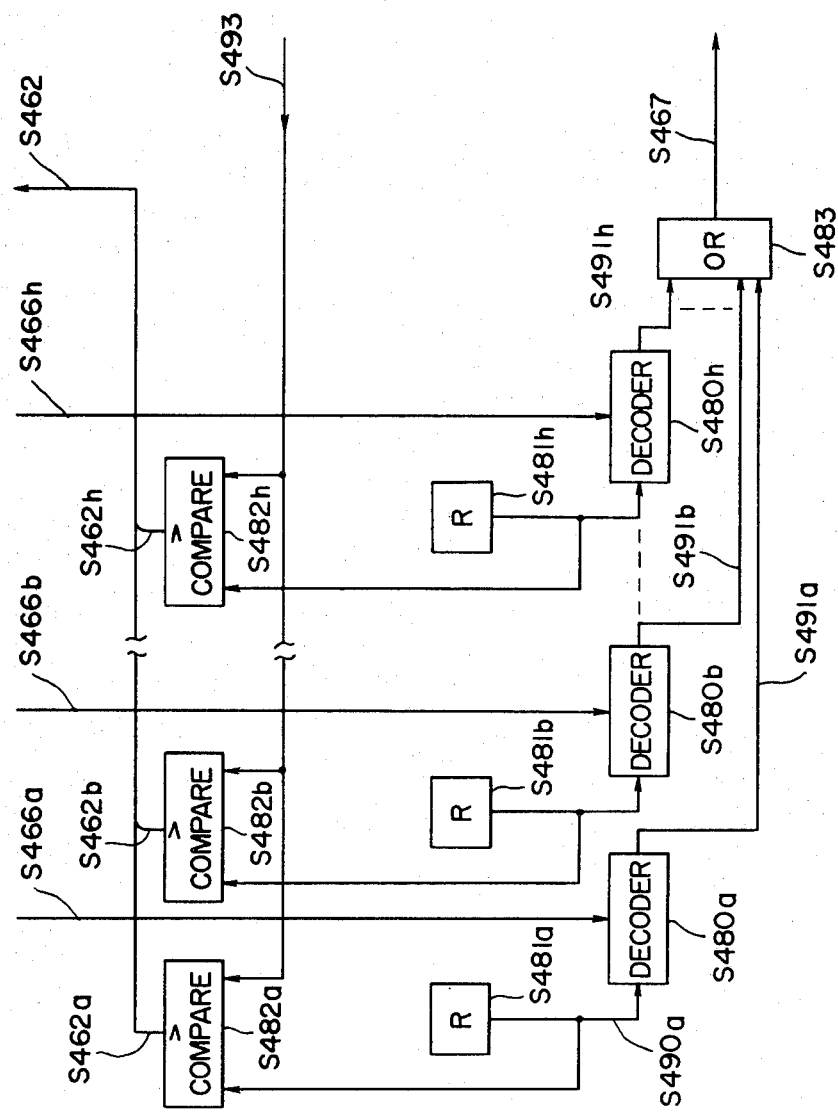
F I G. 14

REGION INFORMATION PROCESSING SYSTEM

CROSS-REFERENCE TO RELATED APPLICATIONS

This application is a continuation in part of my prior application Ser. No. 45,261, filed June 4, 1979, entitled REGION INFORMATION PROCESSING SYSTEM and now abandoned, which in turn is a continuation in part of my prior application Ser. No. 915,185, filed June 14, 1978, entitled REGION INFORMATION PROCESSING SYSTEM, and now abandoned.

BACKGROUND OF THE INVENTION

This invention relates to region information processing systems.

In the work performed by an electronic digital computer, there are problems which treat the information about multi-dimensionally spread spaces, namely regions, such as image processing, computer graphics, a statistical processing of data distributed in a space and pattern recognition.

However, as the fundamental function of a digital computer comprises the arithmetic operations between two pieces of data, even if a problem which should be processed geometrically is proposed, it is necessary that a processing method must be set up for the computer so as to solve the problem by chain of numerical analysis procedures. Thus, the computer often has to make a detour in forming such processing procedures. Accordingly, under the present circumstances, satisfactory speed and throughput cannot be expected. Furthermore, in the case where high speed processing is required, the problem must be solved by using a high speed computer in a parallel mode. Therefore, a huge system will be required, and accordingly this approach is impractical.

SUMMARY OF THE INVENTION

An object of the invention is to provide a region information processing system in which region information can be processed efficiently and quickly.

According to the invention there is provided a region information processing system for processing information concerning a plurality of objective regions in a field to produce information concerning a synthetic region to be formed by synthesizing the information concerning the objective regions, the information concerning each of the objective regions being provided by external region information source, the region information processing system comprising:

(a) a subfield designating device for sequentially designating subfields each constituting part of the field, by providing, one at a time, subfield designating data, (b) a plurality of surveying devices each associated with a corresponding one of the regions and each responsive to the subfield designating data for examining the region information source to produce local data of the subfield being designated concerning the associated region, the local data including at least region flag data indicating whether or not the subfield is inside the boundary of the associated region, and (c) a synthesizing device responsive to the local data of the subfield concerning the objective regions for judging whether or not the local data of the subfield concerning the objective regions satisfy a predetermined condition to produce, depending on the result of the judgement, region flag data indicating whether or not the subfield being designated is inside the synthetic region.

BRIEF DESCRIPTION OF THE DRAWINGS

In the accompaying drawings:

FIG. 4 is a block diagram showing an embodiment of a region information processing system according to the invention;

FIG. 5 shows the arrangement of a surveying device adapted to receive boundary defining type region data;

FIG. 12 shows one example arrangement of the single purpose processing unit S40$i$;

FIG. 14 shows, in detail, a part of the switching unit S445.

DESCRIPTION OF THE PREFERRED EMBODIMENTS

Figure 1:
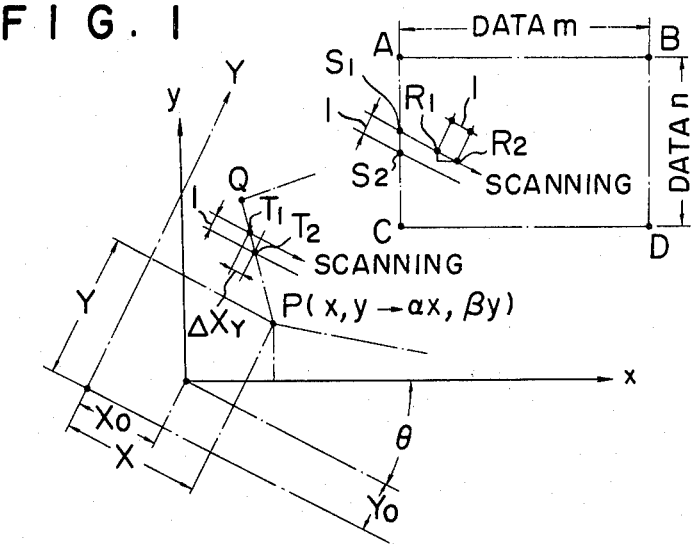
FIGS. 1 through 3 show the scanning method of boundary defining type region data.

FIG. 4 shows an embodiment of a region information processing system according to the invention.

The region information processing system according to the present invention processes known information concerning a plurality of given or objective regions in a field to produce new or desired information concerning one or more new synthetic regions to be formed by synthesizing the objective regions. The synthetic regions are in the same field as the objective regions. The field is imaginarily divided into a plurality of subfields. The term "region" is then considered as a set of subfield having a common feature which other fields do not have. The information or data concerning each of the objective regions is provided by a respective one of external region information sources 4. The information concerning the regions is called region information.

In the embodiment shown, each of the external region information sources 4 comprises a memory device, in which coded data reflecting region information are stored. The memory device may be in the form of a frame buffer of a graphic display system of a raster scan type which is now widely used. The memory device may alternatively comprise a memory device of a computer system used, for example, in the field of computer graphics.

The region information provided by the information source 4 includes information concerning the boundary of the region and data concerning the attribute of each subfield in the region.

The region information processing device comprises a subfield designating device 8 which sequentially designates the subfields by providing, one at a time, subfield designating data. In the embodiment described, the subfields have substantially the same size and arem arranged in a series of horizontal zones or lines, one under the other.

All the subfields are designated in turn, and the sequential designation of the subfield is also called scanning. The scanning is made in the order in which the subfields are traversed by a series of horizontal lines in a manner similar to that commonly adopted in television technique.

The region information processing system further comprises a plurality of surveying devices 3 each provided in association with a corresponding one of the region information sources 4 and each adapted to receive the subfield designating data an to examine the associated region information source to produce local data of the subfield concerning the associated region. The local data produced by each of the surveying devices 3 include at least region flag data indicating whether or not the subfield being designated is inside the boundary of the associated region.

The region information processing system further comprises a synthetic processing section 2 including a synthesizing device which is adapted to receive the subfield designating data and the local data of the subfield concerning the objective regions and to judge whether or not the local data of the subfield concerning the objective regions satisfy one or more of predetermined conditions to produce, depending on the result of the judgement, region flag data respectively indicating whether or not the subfield being designated is inside the respective synthetic regions. By doing so, the synthetic processing device 2 defines the synthetic regions to be newly formed. The condition upon satisfaction of which the subfield being designated is found to be inside each of the synthetic regions is preset. For instance, a synthetic region may consist of subfields having attribute data of more than a predetermined value. Another synthetic region may consist of subfields which are inside of both of two certain objective regions.

The synthetic processing section 2 of this embodiment is further adapted to synthesize the local data of the subfield concerning the objective regions to produce attribute data of the subfield concerning the synthetic region. The correlations between the input local data concerning the objective regions and the output local data concerning the synthetic regions are preset.

In addition, a CRT monitor 9 is connected to the synthetic processing section to visualize the information concerning the synthetic regions.

In the embodiment shown, as will be described in detail later, the synthetic processing section 2 comprises a priority control device which receives region flag data concerning more than one of the synthetic regions and selects, according to preset priority, one of the synthetic regions and to produce the region flag data indicating that the subfield being designated is inside the selected region and the region flag data indicating that the subfield being designated is outside the unselected regions. With this arrangement, a synthetic region which would otherwise be overlapped with another synthetic region having a higher priority is suppressed. The resultant indication on the CRT monitor 9 is that the region having a lower priority appears as being "hidden", partly or entirely, behind the region of a higher priority.

In the embodiment described, the attribute data of the subfields outside the synthetic region is controlled to assume a value of zero. This will appear on the CRT monitor 9, if not overlapped by another region, as black or lowest brightness. When this processing is made, the area outside the region may be regarded as forming another synthetic region having a common attribute data value of zero.

Before describing the details of the various devices shown in FIG. 4 explanation which is applicable to components and signals which often appear in the following description is given.

In a selector, one input signal is selected from two input signals according to a selecting signal value. The relationship between the selecting signal value and the signal to be selected will be described whenever necessary.

A flip-flop is a circuit in which an output signal is set to "H" or "L" in response to the leading edge of a set or reset signal, respectively. The distinction between the set signal and the reset signal will be described whenever necessary.

In a toggle type flip-flop, an output is set to "L" with a reset signal, and is inverted with a clock input.

A register is used to latch its input data therein at the leading edge of a clock signal, and from this time instant its output signal is equal to the content thus latched. The content can be cleared to zero with the aid of a clear signal applied thereto.

In a counter, its binary output signal value is increased or decreased by one (1) at the rise of the clock input when an enable signal is set at "H". When a clear signal is set at "H", the output is set to "0". When a load signal is set at "H", the output signal value is set to equal a predetermined signal value at that time unconditionally.

In a decoder, one of the output signals is raised to "H" according to the binary value of the input signal. In a decoder having an enable signal terminal, all of the outputs are set at "L" as long as the enable signal is set at "L".

A single pulse generator produces a pulse having predetermined width with the leading edge of an input signal used as a trigger (commonly referred to as the well known "one-shot multivibrator").

A clock generator produces a train of pulses having a predetermined width and period, the output starts with the leading edge of an input signal as a trigger and is maintained when the input pulse is set at "H".

The above-described circuit elements are constituted by conventional circuits.

A line scan phase signal is maintained at "H" for one line scan (which is the scan from $X_S=0$ to $X_S=X_{SMAX}$).

A plane scan phase signal is maintained at "H" for one plane scan which is carried out with the continuous line scan from $Y_S=Y_{SMAX}$ to $Y_S=Y_{SMIN}$.

As mentioned before, region information is provided by the region information sources 4. Where the subfields are arranged in a series of horizontal lines, it is convenient to identify each subfield by coordinate values X, Y in an orthogonal coordinate system. The region information sources 4 provide region information in terms of or in relation to the coordinate values.

The scanning is carried out by the surveying device 3 including electronic logical circuit, and the region information which is provided as electronic logical information is referred thereto.

Information is placed in the region information source 4. Region configuration information is given by the coordinates of points on a boundary, the number of which is sufficient for reconstructing the region. The coordinate values are arranged as a group of segments of a line, and the position of the subfield containing the intersection of the segment and scanning line is calculated before the scanning along the particular scanning line. The intersections thus calculated are arranged successively in the order in which they are scanned, and whenever the subfield containing the intersection is designated a signal is produced. This signal indicates change of the state as to whether or not the subfield is inside the region. Distributed information is also placed in the memory circuit whose memory addresses are related to the coordinate values. Accordingly, the distributed information is read out in response to the scanning coordinate value. In this case, if it is possible to set the value indicating the outside of the region in such a manner that it can be distinguished from the values which are effective at the inside of the region, the operation concerning the configuration can be eliminated. In contrast, in the case of uniform attributes, reading the distributed information can be eliminated.

The coordinate values have been generated in the surveying devices 3 (the details will be described later); then, the subfield designating device 8 delivers only the timing signals.

The subfield designating device 8 comprises clock generators, a plane scan phase signal generator and a line scan phase signal generator. The plane scan phase signal generator and the line scan phase signal generator may comprise conventional counter circuits. The line scan phase signal 802 (FIG. 6A) is set to "H" when a predetermined number of fundamental clock pulses are counted, and is set to "L" when another predetermined number of fundamental clock pulses are subsequently counted. Furthermore, when third predetermined number of fundamental clock pulses are then counted, the counter is reset. This operation is repeatedly carried out to form signal 802. The plane scan phase signal is formed in the similar manner with the line scan phase signal as a clock input signal.

The data coordinate system will be described with reference to FIG. 1.

Here, region in an original coordinate system x-y is superposed on a standard coordinate system X-Y. In this case, the unit lengths at the x coordinate axis and the y coordinate axis are determined by the predetermined magnification factor $\alpha$ and $\beta$; then, the origin of the coordinate system x-y is set at a point $(X_0, Y_0)$ in the standard coordinate system X-Y, finally, the coordinate system x-y is rotated around the point $(X_0, Y_0)$ by angle $\theta$. Here, counterclockwise rotation angle $\theta$ is assumed to be positive.

Let the coordinates of a point P be (x, y); then, the coordinates (X, Y) in the standard coordinate system X-Y can be expressed by the following Equation (1):

$$\left. \begin{array}{l} X = X_0 + \alpha x \cos \theta - \beta y \sin\theta \\ Y = Y_0 + \alpha x \sin \theta + \beta y \cos\theta \end{array} \right\} \quad (1)$$

On the other hand, with respect to the region configuration, the coordinates $(X_U, Y_U)$ and $(X_L, Y_L)$ of both end points of a segment which is one of the boundary lines are specified for each segment. As derived in Equation (3) and shown in FIG. 1 as $T_1T_2$, $$\Delta X_Y = \frac{X_U - X_L}{Y_U - Y_L} \quad (3)$$

the value $\Delta X_Y$ which is the difference X corresponding to a unit displacement of Y, can be obtained; then, the segment can be determined by $X_U$ (or $X_L$), $\Delta X_Y$, $Y_U$ and $Y_L$ also. In the case of $Y_U=Y_L$, $\Delta X_Y$ cannot be calculated. In this case, the boundary line is parallel to the scanning line and the region flag indicating whether or not the subfield is inside the region should not be changed during the scan over the segment.

Processing in the surveying devices 3 will be described below.

Data required by the surveying devices are $X_U$, $\Delta X_Y$, $Y_U$, $Y_L$ and $X_B$. For the data $X_B$, which is the current value of X corresponding to the current position of scanning line $Y_S$, $X_u$ (in this example, the scanning is effected from above, and therefore $X_L$ in the case when the scanning is effected from below) is set up as an initial value. Before each X-directional line scanning, line position $Y_S$ is changed as much as $\Delta Y_S$ and relationship between new values of $Y_S$, $Y_U$ and $Y_L$ are checked. Out of the segments of the previous X-directional line scanning, data in which $Y_S$ is not greater than $Y_L$ is removed, and segments in which $Y_S$ is not greater than $Y_U$ is added. Then, $(\Delta Y_S' \times X_Y)$ is added to $X_B$, where $\Delta Y_S'$ is the difference between the value of Y corresponding to each data word $X_B$ and the new value of $Y_S$. Furthermore, this data is arranged in an ascending order as for $X_B$ (in the scanning direction of $X_S$).

Now, the case where the scanning is effected in the direction of increasing $X_S$ will be described.

Figure 2:
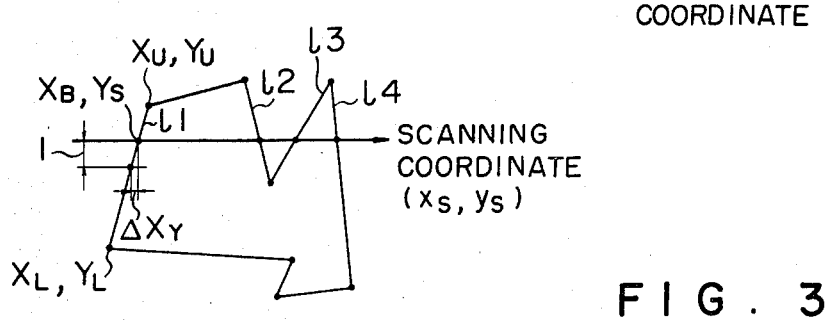

When the line scanning is started, (region state="outside"), $X_B$ of l1 is obtained and is compared with $X_S$. When $S_S \geq X_B$ (l1), (region state="inside") is obtained, and l2 instead of l1 becomes the object of comparison. With $X_S \geq X_B$ (l2), region state="outside" is obtained. The same operation as that for l1 and l2 is effected for l3 and l4. If the end coordinate value of the region is less than the initial value of $X_S$ and is out of the scanning range, a block check between outermost point of region and the initial value of $X_S$ is effected before the line scanning is started. In the case of an intricate configuration as shown in FIG. 2, the distributed attribute is not defined, but it is defined in a different region to be combined by the synthetic processing section. In this example, for the convenience of conversion to memory addresses especially at the time of definition, the configuration of the region having the distributed attribute is restricted to be rectangular with sides which are parallel to the coordinate axes.

Figure 3:
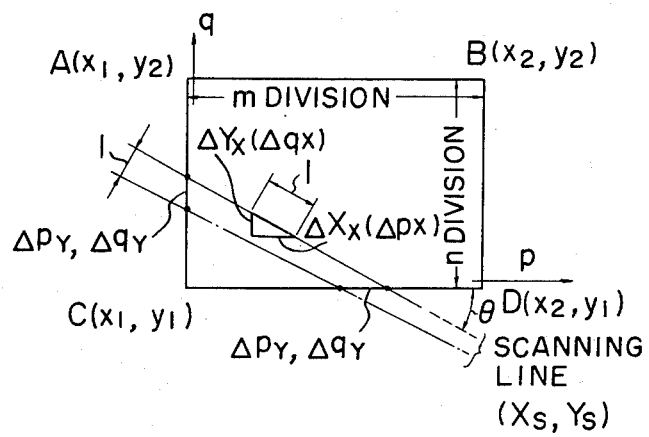

FIG. 3 is an enlarged view showing the region ABDC in FIG. 1. The region ABDC is an example of a region having distributed attributes. It is assumed that, as shown in FIG. 3, the size of a region is determined by $x_1$, $y_1$, $x_2$ and $y_2$; the region is divided into m by n sub regions, and representative data of the sub regions is stored. Furthermore, it is assumed that the m by n data is successively stored, starting from a memory address $E_O$. Then, a sub region in the original region can be expressed by a column address p and a line address q. If the left and right end column addresses are indicated by $p_1$ and $p_2$, respectively, and if the upper and lower end line addresses are indicated by $q_1$ and $q_2$, respectively; then $$p_2 = p_1 + m - 1 \brace q_2 = q_1 + n - 1 \quad (4)$$

It is necessary to obtain the difference of column and line addresses $\Delta p_Y$ and $\Delta q_Y$ corresponding to a unit displacement of $\overline{Y_S}$ on the boundary line. In the case of the segment $\overline{AC}$ for instance:

$$\text{Point } C: x_1, y_1, p_1, q_1 \xrightarrow{\text{coordinate conversion}} X_a, Y_a, p_1, q_1 \brace \text{Point } A: x_1, y_2, p_1, q_1 \xrightarrow{\hspace{2cm}} X_b, Y_b, p_1, q_2 \quad (5)$$

If, in Expression (5), data greater in Y and data smaller in Y are suffixed with U and L, respectively, then Expression (5) can be rewritten as follows:

$$X_U, Y_U, p_U, q_U \brace X_L, Y_L, p_L, q_L \quad (6)$$

Therefore, the following Expression (7) can be derived:

$$\Delta p_Y = \frac{p_U - p_L}{Y_U - Y_L} \brace \Delta q_Y = \frac{q_U - q_L}{Y_U - Y_L} \quad (7)$$

In the case of $\overline{AC}$, $\Delta p_Y = 0$. In general, one of the two differential values in Expression (7) is equal to zero at all times. Originally, p and q have meaning when they are integers; however, data such as $\Delta p_Y$ or the like, which are changing during the scanning stage, have fractions during the process so as to minimize an accumulative error which may be caused when such values are successively added.

Next, the differences $\Delta p_X$ and $\Delta q_X$ of p and q corresponding to $\Delta X_S = 1$ along the scanning line are obtained. In this case, only one set of values are obtained, unlike the above-described case where $\Delta p_Y$ and $\Delta q_Y$ are defined for every boundary line. That is, one set of difference values is inherent to one coordinate transformation.

From FIG. 1 and FIG. 3, the following Expressions (8) and (9) can be established:

$$\Delta X_X = \cos(-\theta) \brace \Delta Y_X = \sin(-\theta) \quad (8)$$

and $$\Delta p_X = \frac{m}{\alpha(x_2 - x_1)} \Delta X_X = \frac{m}{\alpha(x_2 - x_1)} \cos(-\theta) \brace \Delta q_X = \frac{n}{\beta(y_2 - y_1)} \Delta Y_X = \frac{n}{\beta(y_2 - y_1)} \sin(-\theta) \quad (9)$$

In the above-described region scanning, each segment is represented by one set of data $X_U$, $\Delta X_Y$, $Y_U$ and $Y_L$. However, in handling a distributed attribute, a set of $p_U$, $q_U$ (or $p_L$, $q_L$) and $\Delta p_Y$, $\Delta q_Y$ is added to the aforementioned set of data, and similar to the variable $X_B$, since variable data with respect to p and q according to the shifting of scanning line $p_B$ and $q_B$ is necessary, such data is changed when $X_B$ is changed in a similar way. In addition, $\Delta p_X$ and $\Delta q_X$ are provided as common data for the scanning operation. From the instance when $X_S$ exceeds $X_B$ and enters the region, with respect to address variables $p_B'$ and $q_B'$ (initial values being $p_B$ and $q_B$), $\Delta X_S \times \Delta p_X$ and $\Delta X_S \times \Delta q_X$ are added according to the stepping action of $\Delta X_S$. The relationship between a memory address E and the column and line addresses p and q can be expressed by a variety of rules; however, one example thereof is:

$$E = E_0 + [q - q_L] + [p - p_L] \quad (10)$$

where $0 \leq [q - q_L] < n$, $0 \leq [p - p_L] < m$ and [ ] is Gauss symbol.

A surveying device 3 as shown in FIG. 5 can be considered as an example to realize the above-described function.

The working data memory device 40 receives from the associated region information source 4 and stores the data of segments forming the boundary lines of the regions whose components are $X_U$, $\Delta X_Y$, $Y_L$, $X_B$, $p_U$, $q_U$, $\Delta p_Y$, $\Delta q_Y$, $p_B$ and $q_B$. However, it should be noted that the data $p_U$ through $q_B$ is required when distributed attribute information exists. In this case, since the limitation can be made with respect to a rectangular region, the required capacity is only for four sides of the rectangular region. In the case where no distributed attribute is defined, the configuration is not limited; therefore, as the capacity of the working data memory device 40 is increased, more intricate regions can be expressed. The data in the working data memory device 40 is referred to in ascending or descending order of value $X_B$ during intervals of the line scanning in X-direction. Therefore, an alignment control device 50 controls the alignment of the data of the working data memory device 40. For this purpose, there are appended memory devices or registers whose memory cells are related to every point of X along the scanning line, and whether or not the state of region (inside or outside) changes is stored in the cell. A scanning control device 60 operates so that the line scanning operation is repeated the necessary number of times in response to an instruction input signal provided by the subfield designating device 8.

In case where, in the standard coordinate system, the line scanning in the X direction ($X_S$) is shifted in the Y direction ($Y_S$) to cover a surface will be described. When the distributed information has been defined, the current column and line addresses $p_B'$ and $q_B'$ are delivered to the information access control device 70. With respect to the distributed attribute information, where it has not been defined, a sign representing that fact is outputted, and where it is defined, a memory address is formed by using $p_B'$ and $q_B'$ whereby the information is read and is delivered to the synthetic processing section 2. The region flag circuit 90 forms a region flag signal indicating the "inside" or "outside" of the region, which is delivered to the synthetic processing section.

Figure 6A:
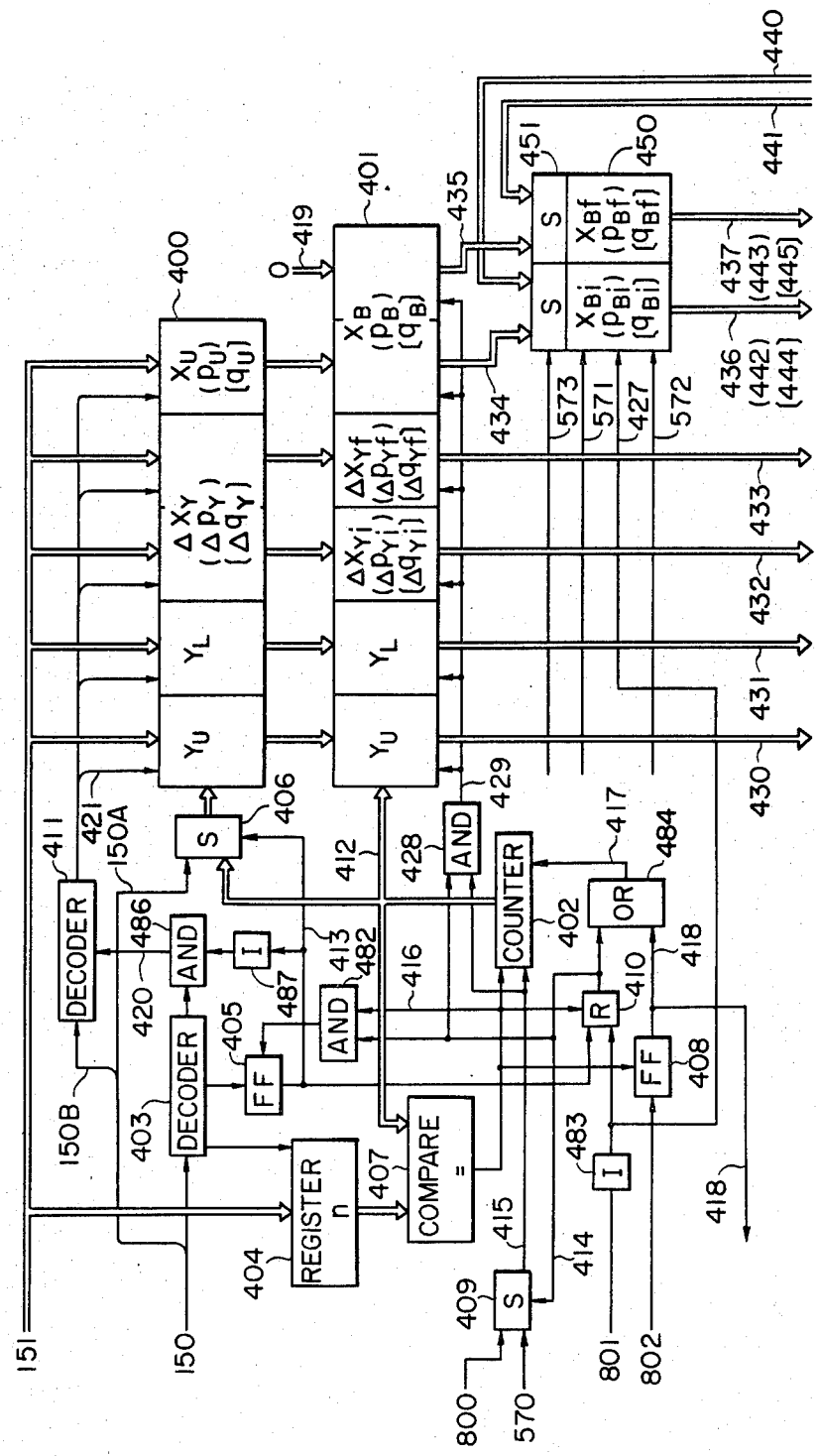
FIGS. 6A and 6B show the arrangement of the working data memory device 40.
Figure 6B:
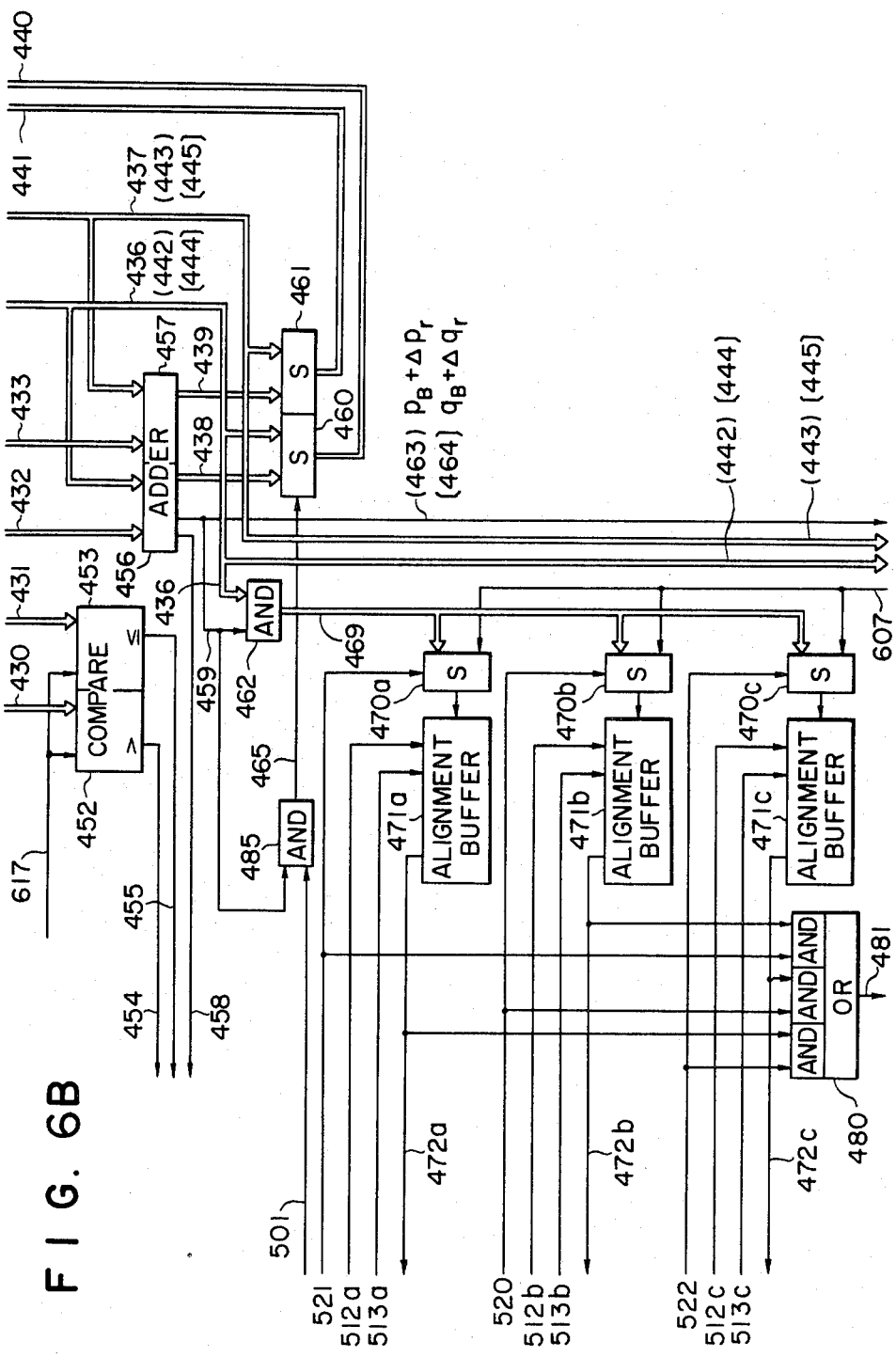

One example of the arrangement of the working data memory device 40 is shown in FIGS. 6A and 6B.

Each set of data $Y_U$, $Y_L$, $X_U$, $\Delta X_Y$, $p_U$, $\Delta p_Y$, $q_U$ and $\Delta q_Y$ generated by the region information source 4 is first stored in the data storing section (A) 400, then transferred to the data storing section (B) 401 when no plane scan is carried out. In the data storing section (B) 401, fraction parts (initial value=all "0") are added to the data $X_U$, $p_U$, and $q_U$ whereby the initial values $X_B$, $p_B$ and $q_B$ are obtained. In general, the data words $X_B$, $p_B$ and $q_B$ have different values whenever a line scan is effected. Therefore, a data storing section (C) 450 is provided separately. During the first line scan, the data words $X_B$, $p_B$ and $q_B$ are transferred from the data storing section (B) 401 to the data storing section (C) 450. Thereafter, the contents of the section 450 is changed, but the data $X_B$ in the section 401 is not changed. For the purpose of alignment of the data $X_B$, buffers 471a through 471c are provided. In one line scan, the writing operation is effected against the buffer with the values of each data $X_B$ as address values, and the reading operation is carried out in the order of the addresses in the next line scan. Then, the aligned $X_B$ point is read out when $X_S=X_B$. Then, the buffers are cleared to zero for the next writing operation. For this purpose, in this system three alignment buffers 471a through 471c are provided, and they are used in turn.

The data storing sections 400 and 401 are made up of random access memories (RAM). Signals 413 and 414 are at "L" except during the block transfer period from the data storing sections 400 to 401; therefore, the data storing sections 400 and 401 function independently. As the signal 413 is set at "L", at selector 406, signal 150A is selected as the address signal of the section 400. The signal 150A is a part of an access control signal 150 from the region information source 4. When the access control signal 150 specifies the writing of data into the section 400, the output of a decoder 403 is raised to "H". This output is applied to an AND gate 486, whose output is an enable signal 420 for a decoder 411. Another input to the AND gate 486 is set at "H", because it is the inverted signal of 413. Accordingly, the decoder 411 operates to decode a part 150B of the signal 150 to thereby send a writing pulse to a relevant block in the section 400. For instance, the writing operation for a $Y_U$ data block is dependent on signal 421.

On the other hand, an address signal 412 for the section 401 is the output of a counter 402, and a write control signal 429 is the output of an AND gate 428. As one input 413 is set at "L", no write pulses are generated in this period, and the data are successively provided on lines 430 through 435 according to the address signal 412. An input 570 to a selector 409 is selected as the clock 415 of the counter.

A register 404 is used to store the number of data (n). The output of the register 404 and the signal 412 are compared with each other in a comparator 407. When they are coincident, the output 416 of the comparator 407 is raised to "H" and applied to the counter 402 as a clear signal. A flip-flop 408 employs a line scan phase signal 802 as its set signal, and the comparator's output 416 as its reset signal. The output 418 of the flip-flop is applied as an enable signal to the counter 402 through an OR gate 484. Accordingly, at the leading edge of the signal 802, the counter 402 is placed in its enable state. The enable state is terminated at the time of coincidence with a value n, and the address is reset to zero. As long as the signal 802 is provided, this operation is repeatedly carried out.

Now, the data storing section (C) 450 will be described. This section comprises a First-In First-Out (FIFO) type serial memory. A selector 451 is provided at the input side of the section (C) 450. When a signal 573 is set at "H", signals 434 and 435 are selected. Since the reading of the data in the block 401 and the following operation are controlled by clock signals, the writing and reading operations in the section (C) 450 are also controlled by clock signals. Reference numeral 571 is a clock signal for the former, and reference numeral 572 is a clock signal for the latter.

When the signal 427 is set at "H", the FIFO serial memory 450 is reset. Since this signal 427 is obtained by inverting a signal 801, the FIFO serial memory 450 is reset when the plane scan is terminated. The initial line scan phase of the plane scan is used to load the initial value of data $X_B$ into the memory 450. During this phase only, the signal 573 is set at "H" and the clock signal 572 is not supplied. The address signal to the data storing section 401 is changed as described before. Therefore, data $X_B$ is successively read out, and is stored through the selector 451. Since the reading clock signal is not supplied, n data is stored, starting with the first data. $X_{Bi}$ corresponds to the integer part of $X_B$, and $X_{Bf}$ corresponds to the fraction part of $X_B$. The $X_B$ data lines 436 and 437 include two paths, one of which goes to the selectors 460 and 461 after being added with $\Delta X_Y$ in the adder 456 and 457, another goes directly to the same, respectively. The outputs 440 and 441 of the selector 460 and 461 are applied to the selector 451. In the selectors 460 and 461 the addition output is selected when the selection signal 465 is set at "H".

After the second line scan phase, the selector 451 is switched to select 440 and 441. An output clock signal 572 is supplied, and the ordinary processing cycle begins.

Figure 7:
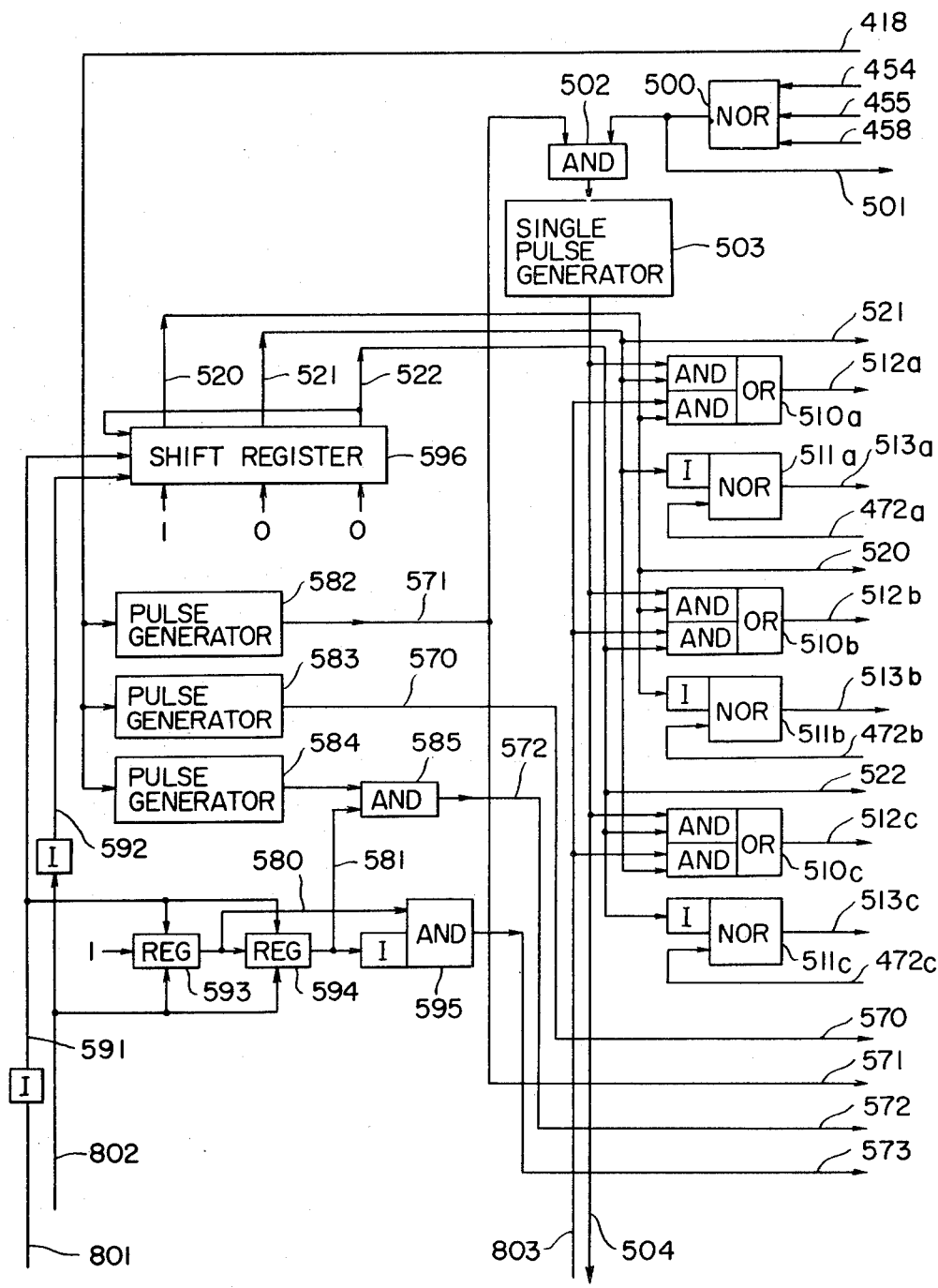
FIG. 7 shows the arrangement of the alignment control device 50.

With respect to data corresponding to the state $Y_S > Y_U$, signal 501 from FIG. 7 is set to "L". Therefore, as long as a signal 459 is set at "H", $X_B$ will be left unchanged, and is applied to the memory 450 again. With respect to the data corresponding to the state $Y_U \geq Y_S > Y_L$, the signal 501 is raised to "H". Therefore, when the signal 459 is set at "H", $X_B + \Delta X_Y$ is applied as an updated $X_B$ to the memory 450. The integer part of $X_B$ (436, 469) is applied, as the address of an intersection alignment buffer, to selectors 470a, 470b and 470C through an AND gate 462. The adders 456 and 457 are ordinary binary adders. When an overflow occurs with respect to the field of $X_B$, a signal 458 is raised to "H". When the result is negative, the signal 459 is set to "L". In this case, the output 469 of AND gate 462 is zeroed. That is, all lines which are shifted left from the scan range are handled as intersection coordinate=0. When $X_B + \Delta X_Y < 0$, the signal 459 is set to "L", and in the case of overflow, the signal 501 is set at "L" as described later. In any case, the selection signal 465 is set to "L". Therefore, from the time instant when ranage-over state arises, $X_B$ is left unchanged, and in following line scan phases the same situation will occur repeatedly. The data $Y_U$ and $Y_L$ are compared with scanning Y-coordinate $Y_S$ in comparators 452 and 453. A signal 454 is set at "H" when $Y_S > Y_U$. The signal 455 is set at "H" when $Y_S \leq Y_L$. These two signals and signal 458 are utilized as the writing control on the intersection alignment buffers and as the switching control on the selectors 460 and 461.

For the cross point alignment, three buffer circuits, identical in arrangement, are provided. In each buffer circuit, three different operations are carried out for three consecutive phases of line scan, respectively. In one line scan phase, these three buffers carry out different operations, respectively. Hereinafter the three different operations will be referred to as "first, second and third steps" respectively. Typically, the buffer 471a will be described. With respect to signals 520, 521 and 522, in every line scan phase, only one of these three signals is set at "H", starting with signal 520 which is set at "H" at first line scan phase, the "H" signal changed by rotation like 520→521→522→520→... In selector 470a the signal 469 is selected when the selection signal 521 is set at "H". On the other hand, 607 is the X-coordinate $X_S$ of the line scan.

The intersection alignment buffers 471a, 471b and 471c are ordinary RAM's, having an address range corresponding to the allowed range of $X_S$. For instance, if it is assumed that the data width of $X_{Bi}$ is 10 bits, and the data width of $X_S$ is also 10 bits which covers the range of 0 to 1023; thus, the intersection alignment buffers 471a, 471b and 471c have an organization of 1024×1.

The output of the selector 470a is the address signal to the buffer 471a. An output signal is 472a, an input signal is 513a, and a writing control signal is 512a. By setting the signal 512a to "H", the value (1 or 0) of the signal 513a is written in an address indicated by the address signal at that time.

In the first step, the signal 521 is set at "L", and the data of $X_S$ is supplied as the address. In this case, the data input 513a is 0, and a clock pulse which is synchronous with the variation of $X_S$ is applied to 512a, whereby the buffer 471a is cleared. That is, the first step is a clearing step.

In the second step, the signal 521 is set at "H", and the address signal is the data $X_{Bi}$ on the line 469, whose value is varied at random, and multiple access to the same location may be considered. In this step, the signal 513a is obtained by inverting the signal 472a. Only when $Y_U \geq Y_S > Y_L$ and no overflow occurs, is a single writing pulse applied to the line 512a. Therefore, when the scanning line $Y = Y_S$ crosses the boundary line and the intersection coordinate is not outside the rightmost range of $X_S$, the data located at the position having the same address value as the intersection coordinate is inverted. In other words, in the case of being the first writing at that step, the data become a "1", since the data is a "0" at the previous step. Besides, in the case of being repeatedly written at the same address, it becomes a "0" during the even times of access and becomes a "1" during the odd times of access. The data corresponding to the state $X_B = \Delta X_Y < 0$ is treated as $X_B = 0$ at all times. Therefore, as mentioned previously, it is apparent that in the case when an even number of border lines are outside the leftmost of $X_S$-range, no change occurs at the start position of a scan. When the number of border lines are an odd number, it is equivalent to the case when there is a border line at the start position of a scan. Thus, the second step is an intersection recording step.

In the third step, the data $X_S$ is selected as the address again, but no writing pulse is fed at all. The contents are successively read out in the direction of an increase of $X_S$, so that the presence or absence of an intersection is detected. The output 481 of an AND-OR gate 480 is set equal to the signal 472a because in this phase 522 is at "H". Thus, this step is an intersection reading step.

Thus the data reading to the section 401 is carried out one phase earlier than the actual line scan output.

The first line scan is for loading the initial value of $X_B$. Accordingly, the third line scan phase is the first scan output phase.

The policy of the formation of the elements about $p_B$, $q_B$, etc. is similar to that of $X_B$ and $\Delta X_Y$, as indicated in the element for $X_B$, $\Delta X_Y$, etc. with ( ) or [ ]. However, the data $p_B$ and $q_B$ are not related to the intersection alignment operation and are outputted to the scan control device.

The transferring data between the section 400 and 401 will be briefly described.

The region information source 4 sets a number of data n in the register 404 when the data storing operation for the section 400 has been completed. A particular address is assigned to the register 404. One output of the decoder 403 is employed as a clock input to the register 404. Next, in order to raise the transfer permission signal 413 to "H", the set signal of the flip-flop 405 is raised to "H". A particular address is assigned to the flip-flop, and by accessing that address, one output of the decoder 403 sets the flip-flop 405.

As a result, the selector 406 is switched to select 412 immediately. On the other hand, the signal 420 is set to "L", all of the outputs of the decoder 411 are set to "L", and the data storing section (A) 400 outputs only the contents according to the address 412. The signal 413 is the input of the register 410; however, its state is maintained unchanged until the plane scan phase signal is set to "L", because the clock pulse is obtained by inverting a signal 801. That is, the signal 414 is maintained at "L". When signal 801 is set to "L" upon completion of the plane scan, the output 414 of the register 410 is set to "H". The selector 409 is switched to select signal 800. The signal 800 is a clock pulse for block transfer.

One input 414 of an AND gate 428 is at "H", and therefore the writing control signal 429 for the section 401 is identical to the clock signal 415 for the counter 402. The input 414 is applied to an OR gate 484, so that it functions as the enable signal 417 of the counter 402. When enabled, the counter 402 starts its operation, the same address signal is applied to both of the section 400 and 401, and the writing signal 429 is applied to the section 401 in synchronism with the address variation, whereby the block transfer is carried out. When the value of address becomes equal to n, the signal 416 is set to "H", and the register 410 and the flip-flop 405 are reset simultaneously. As a result, the counter 402 stops its counting operation and is reset to "0", and the selector 409 is switched to select the input 570. As the signal 414 is at "L", the writing control signal 429 is not raised to "H", and the operation mode of the section 401 becomes that for read out again. Thereafter, the sections 400 and 401 can operate separately.

The alignment control device 50 is shown in FIG. 7. This device 50 controls the operations from the reading of the data storing section (B) 401 to the reading of the intersection alignment buffers 471a–471c.

Registers 593 and 594 are cascaded, and as clear inputs, use a signal 591 obtained by inverting the plane scan phase signal 801, and use as a clock signal, the line scan phase signal 802. The data input of the register 593 is fixed at "1". When the signal 801 is set to "L", both of the signals 580 and 581 are set to "L". When the signal 802 is raised to "H" for the first time after the signal 801 is set to "H", the signal 580 is set to "H". As the signal 581 is still maintained at "L", the output 573 of the AND gate 595 is raised to "H". At the next time when the signal 802 is raised to "H", the signal 581 also is raised to "H", and therefore the signal 573 is set to "L".

A signal 418 from FIG. 6A is raised to "H" at the start of the line scan. This signal 418 triggers pulse generators 582, 583 and 584 so that clock signals are applied to 571, 570 and 572, respectively. These clock signals 570-572 are equal in period, but their pulse widths and phases are adjusted differently according to their use. The signal 572 is obtained through an AND gate 585, and is not outputted during the first line scan phase in which the signal 581 is at "L".

The signals 520, 521 and 522 for controlling the steps of the intersection alignment buffers 471a-471c are outputted by a 3-bit shift register 596, in which the shifting operation is effected in the direction of 520→521→522. The signal 522 is connected to the serial input. The signal 591 obtained by inverting the input 801 is employed as the parallel load control signal, and the initial state "1 0 0" is set at the end of the plane scan phase. The signal 592, obtained by inverting the input 802, is employed as the shift control input so that the shifting operation is effected at the end of each line scan phase. Thus, only one signal among the signals 520, 521 and 522 is set at "H" at any particular instance, which is subjected to a circular shift every line scan phase.

Figure 8:
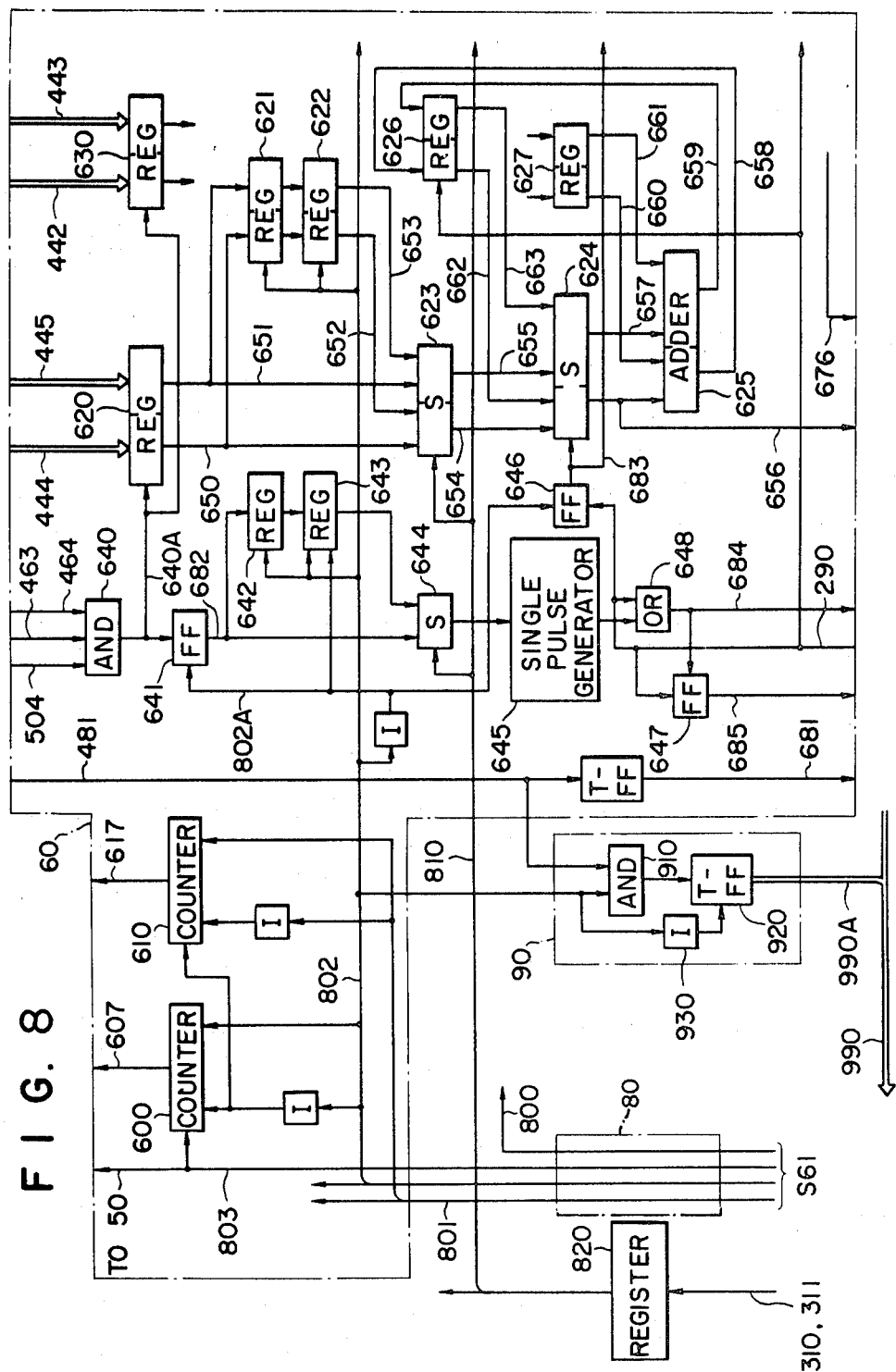
FIG. 8 shows the arrangement of the scanning control device 60, the interface 80 and the region flag circuit 90.

The signal 803 is a pulse for writing "0", and this pulse is synchronous with the variation of the $X_S$ signal 607 (FIG. 8). The writing signal 504 in the second step is outputted by a single pulse generator 503. When $Y_U \geq Y_S > Y_L$ and no overflow occurs, all the inputs of a NOR gate 500 are at "L", and its output 501 is raised to "H". This is one of the elements for the selection signal of the above-described selectors 460 and 461 (FIG. 6B), and is one input to an AND gate 502, as the one of elements for the writing signal generating conditon. Accordingly, when the signal 501 is set at "H", one pulse of the clock signal 571 (which is generated at the rate of one pulse per data word) is passed through the AND gate 502 to trigger the pulse generator 503. Therefore, in this operation, one writing pulse is outputted as the signal 504.

An AND-OR gate 510a, for generating the writing signal to the buffer 471a, provides an output 512a. Reference character 511a designates a gate for the input data of the buffer 471a.

In the first step, a signal 520 is set at "H", and a signal 521 is set at "L". Therefore, in the gate 510a, the signal 512a is equal to the signal 803. One writing pulse is delivered to each address of the alignment buffers. On the other hand, the input data 513a is set at "L" irrespective of the signal 472a. Therefore, the buffer 471a is entirely cleared.

In the second step, a signal 521 is set at "H", and the signal 520 is set at "L". Therefore, only when the writing condition is satisfied, i.e., when the signal 501 is set at "H", is the writing pulse delivered as a signal 512a. On the other hand, the function of a gate 511a is equal to that of an inverter, and the input data 513a is obtained by inverting the signal 472a.

In the third step, both of the signals 520 and 521 are set at "L", and no writing pulse is outputted.

The circuit elements of the other alignment buffers operate similarly as in the above-described case.

FIG. 8 shows the scanning control device 60, the interface device 80 and the region flag circuit 90.

During the progress of a line scan, a signal 481 is outputted at the intersection point of the region border line and the scan line. The signal 481 is applied to one input terminal of an AND gate 910 in the circuit 90 and the line scan phase signal 802 is applied to another input terminal. The output of the AND gate 910 is employed as the clock input of a toggle type flip-flop 920. Used as the reset signal of the flip-flop 920 is a signal obtained by inverting the signal 802, and the initial state of the region flag, i.e., the initial level of the output 990A, is set at "L".

When the line scan is effected, then the output is inverted in response to every pulse 481, which indicates the outside or inside state of the region. The region flags of the processing sections, designated 990, are collectively delivered to the synthetic processing section 2. Signal 681 is a signal which is similar to the region flag, and is applied to the attribute information access control device 70.

An up-counter 600 outputs an X-direction scan coordinate $X_S$ as a signal 607. The count-up clock signal is a clock signal 803 supplied from the subfield designating device 8. The counter 600 uses the line scan phase signal 802 as its enable signal, and uses a signal obtained by inverting the signal 802 as its clear signal.

A down-counter 610 outputs a Y-direction scan coordiate $Y_S$ as a signal 617. Its count-down clock signal is obtained by inverting the line scan phase signal 802, and its enable signal is the plane scan phase signal 801, the inverted signal is employed as its load signal. When the load signal is set at "H", the maximum value of $Y_S$ is set in the counter 610.

As described above, it is possible to carry out an optional scan in the range allowed to the system by three signals 801, 802 and 803 from the subfield designating device 8.

Now, a column and row address generating section for access to distributed attribute will be described. In defining a distributed attribute, the region configuration is limited to a rectangular configuration, as was described. If the scanning field cannot cover the region, data for the partial region which is a common field of an object region and the scanning field are constructed by the region information source 4.

Accordingly, in this case, in the addition ($X_B$-$\Delta X_Y$) no overflow is caused, and it will never become negative. As for data $p_B$ and $q_B$, they should be provided only for the border line on the left end side of the scan. Then for the data on the right end side, $p_B=q_B=0$, and $\Delta p_Y = \Delta q_Y < 0$. Accordingly, with this border line data, the outputs 463 and 464 are set at "L". The latching signal 640A to registers 620 and 630 is the output of an AND gate 640. When the signals 463 and 464 described above are "H" and the pulse is provided on the line 504 (i.e., when $Y_U \geq Y_S > Y_E$), the data $q_B$ and $p_B$ are latched, and simultaneously the flip-flop 641 is set. The reset signal 802A of the flip-flop 641 is obtained by inverting the line scan phase signal 802, and therefore the signal 682 is maintained at "H" until the completion of the line scan.

There are two modes for access to the distributed attribute data; they are reading mode and writing mode and are controlled by a signal 810. More specifically, when the signal 810 is set at "H", the reading mode is effected.

First, the case of the column address in the reading mode will be described. In this case, the signals 650, 651 and 682 are selected in selectors 623 and 644.

A flip-flop 646 uses a signal 802A, obtained by inverting the signal 802, as a reset signal. Therefore, an output signal 683 of the flip-flop 646 is set at "L" at the start of the line scan.

When the selection signal 683 is set at "L", the signals 654 and 655 are selected in the selector 624. This output is the column address $q_B'$ corresponding to $X_S$. Accordingly, immediately after the start of the scan, the signal 656 whose value corresponds to $q_{Bi}'$ indicates the initial value of $q_{Bi}$. Data $\Delta q_X$ is set in a register 627, and the added results 658 and 659 by current $q_B$, in adder 625 are led to the input side of a register 626. If the selection signal 683 is raised to "H" and the clock pulse of the register 626 is inputted, then $q_B'$ is successively renewed.

A signal 641 which has been raised to "H" when the initial value of $q_B$ was set, is passed through the selector 644, to thereby trigger a single pulse generator 645, the output of which is passed through an OR gate 648 to set a flip-flop 647. The output 685 of the flip-flop 647 is an access request signal for the distributed attribute memory section of the region information source 4. When the request is accepted, one pulse signal 290 is fed, and the register 626 is set by that signal. A request signal 685 is cleared once, then the flip-flop 647 is set by a signal 684 through the OR gate 648. Furthermore, this resets a flip-flop 646, as a result of which the selector 624 is switched to select the signals 662 and 663. Thereafter, whenever the acceptance signal in response to the request signal is inputted, $q'_{Bi}$ is updated, and reading the distributed attribute data is advanced. The data read out is stored in the buffer memory in the attribute information access control device 70, and it is read out in the next line scan phase to be delivered with the region flag to the synthetic processing section 2. In the writing mode, the data is stored in the buffer memory 720 first, then written into the memory in the next phase. Therefore, it is necessary to store the access parameters to the memory, from the phase that the column and row address is read out of the data memory device until it is actually used. For this purpose, the cascaded registers 621, 622, 642 and 643 are provided. The access parameters are transferred to the next at the leading edge of the signal 802. As a signal 802A obtained by inverting the signal 802 is employed as the clear input of the register 643, the leading edge of the signal 682 can be reproduced at the selector 644 with a delay of two phases. In the writing mode, signal 810 is set at "L", and at the selectors 623 and 644, data via cascaded registers are selected.

The other operations are completely equal to those in the reading operation.

With respect to $p_B$, nothing is shown in the figure; however, the circuitry between the register 630 and the $p_B'$ signal 676 is completely equal to that between the register 620 and the signal 656 in the case of $q_B$.

The interface device 80 serves mainly as the relay section of timing signals. The timing signals are based on the signal 802 which is maintained at "H" during a line scan phase, the signal 801 which is maintained at "H" during a plane scan phase including a plurality of line scan phases, and a clock signal 803 for the timing of an X-direction scan. In addition to those described above, there is a clock signal 800 for block transferring in the data memory device.

A mode signal is preset in a register 820. The output of the register 820 is a signal 810. When the signal 810 is set at "H", the processing section operates in the attributed at reading mode.

Figure 9:
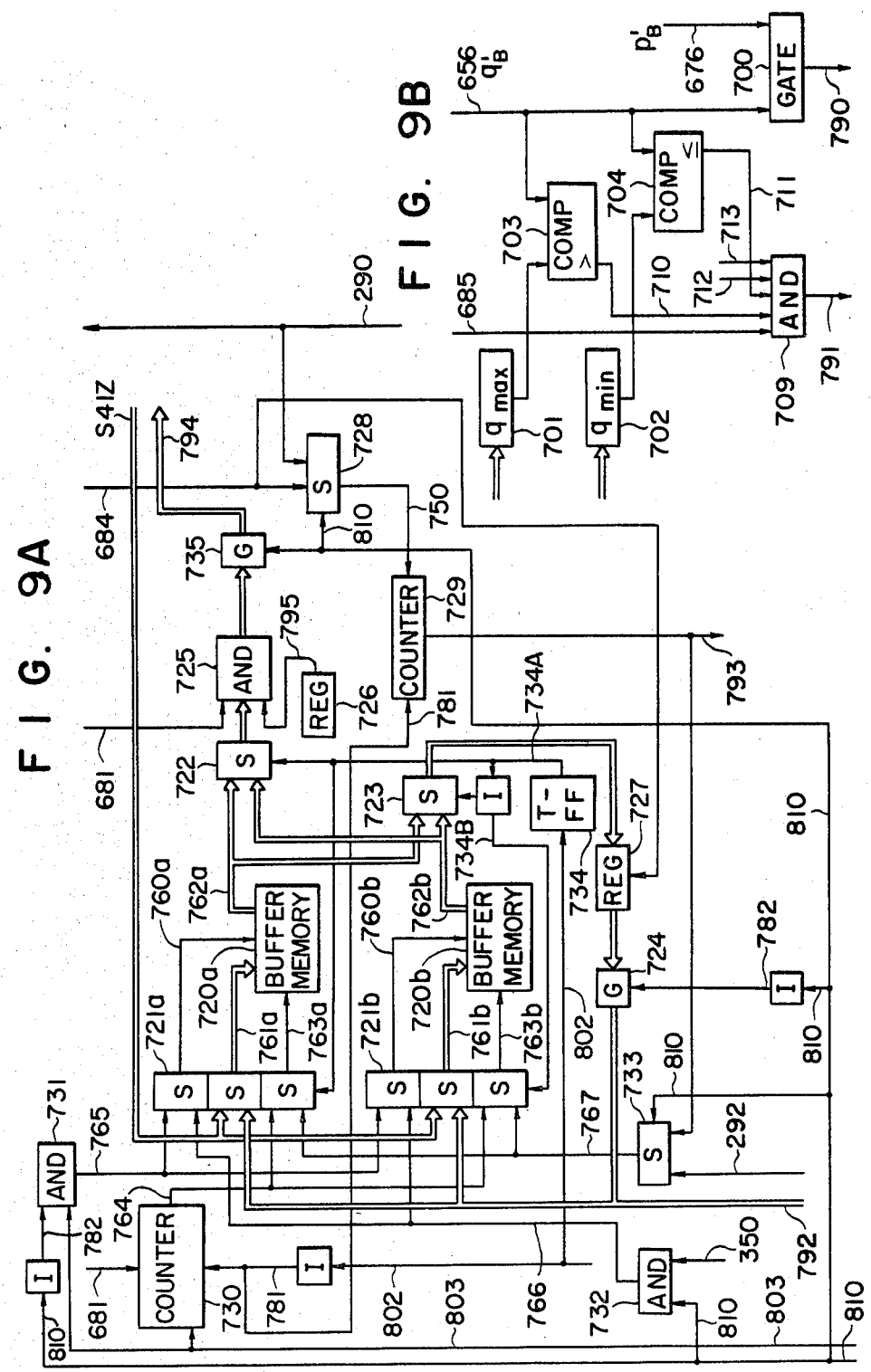
FIGS. 9A and 9B show the arrangement of the attribute information access control device 70.

The attribute information access control device 70 is shown in FIGS. 9A and 9B. Two buffers memory 720a and 720b are provided which can store data for one scan. A memory access is of the one line scan advancement type. Furthermore, the device 70 has a writing function for the up-date of distributed attribute data. A memory address is outputted by a gate 700.

In general, conversion of the column and row address $q_B'$ and $p_B'$ into an address in a memory device is based on equation (10). However, in this example, the row and column addresses are defined over the whole memory space; therefore, when partial memory space is used, corresponding row and column addresses are utilized as access parameters. Accordingly, a signal 790 corresponding to a memory address is a simple combination of column and row addresses $q_{Bi}'$ and $q_{Bi}'$.

The maximum and minimum values of q address are set in registers 701 and 702, respectively, and are compared with $q_{Bi}'$ in comparators 703 and 704. A signal 710 indicates $q_{max} > q_{Bi}'$. Similarly, a signal 711 indicates $q_{Bi}' \geq q_{min}$. Partly being omitted in the figure, a signal 712 indicates $p_{max} > p_{Bi}'$, and a signal 713 indicates $p_{Bi}' \geq p_{min}$.

These four signals and 685 are inputted to an AND gate 709, the output 791 of which finally becomes an access request signal for the memory device.

At the end of the line scan phase, a counter 729 is cleared by a signal 781, and a signal 793 is counted up by the counter at every pulse 750. This is an access identification number which is changed at every memory access, and is to arrange, in the order of coordinates, the distributed attribute data which is read out at random. At the selector 728, the signal 750 follows the acceptance signal 290 when the signal 810 is set at "H", namely in the reading mode, and when it is set at "L", the signal 750 follows the signal 684 which is the set signal for the request signal 685.

The buffer memory 720a and 720b are RAM's to the input sides of which selectors 721a and 721b are connected, respectively. Writing control signals 760a and 760b, input data 761a and 761b, and addresses 763a and 763b are selected from two signal systems. The selection signal 734A is the output of a toggle type flip-flop 734 and the selection signal 734B is a signal obtained by inverting signal 734A. These are inverted for every line scan phase, and the buffer memory input signals and these inverted signals are also used for output data selectors 722 and 724.

A counter 730 is to form the addresses which are increased in response to the scan of the buffer memory. Accordingly, the signal 803 is employed as the clock signal of the counter 730 similarly as in the $X_S$ counter. A signal 781 obtained by inverting the line scan phase signal 802 is used as the clear signal of the counter 730, and a signal 681 which is equivalent to the region flag is employed as the enable signal thereof. Therefore, the initial value of the counter 730 is "0", and only for the period in which the region flag is set at "H", is the value of the signal 764 increased by one at every clock signal.

The signal 765 is the same clock signal as 803 at writing mode; however, it is set at "L" during the reading mode.

A signal 350 is a pulse indicating the sending of data by the region information source 4, which is applied to an AND gate 732. The output 766 of the AND gate 732 is provided only at the reading mode. A selector 733 selects the signal 292 when the selection signal 810 is set at "H", i.e., in the reading mode. The signal 292 originates from the output of a counter 729 and is returned through the region information source 4.

When an access request of reading data is made to the region information source 4, a combination of an address 790, identification mark 793 and request signal 791 is applied. On the other hand, data input from the memory device is carried out with a combination of data 792, identification mark 292 and sending signal 350. In this case, a pair of signals in which the values of the signal 791 and 292 are identical, are handled as they correspond to each other.

In the writing phase of the buffer memory 720a, the selector 721a selects the lower signals, respectively. That is, the signal 767 which is equivalent to identification mark 292 is selected as an address, the read out data signal 792 is selected as an input data, and the signal 766 which is equivalent to send signal 350 is selected as a writing signal. Therefore, whenever the send signal is provided, the data 792 is written in the buffer memory 720a with the value of the signal 292 used as an address. Even if the value of the signal 292 to be received is random and even if the time interval fluctuates, no reading is carried out during this phase, and therefore, no trouble occurs.

In the next scan phase, together with the intersection alignment buffer in the data memory device 40, the buffer memory 720a in this device carries out reading. As an address, the output 764 of the counter 730 is fed thereto, and the content of the counter 730 is increased from 0 by one at a time while the region flag is set at "H". The writing signal 765 is at "L" at all times.

A selector 722 selects the output data 762a at the above-noted time. Therefore, distributed attribute data is outputted as a signal 794 through an AND gate 725 and a gate 735.

Signal 795 which indicates the presence of the definition for a distributed attribute is preset in a register 726. This signal 795 and a signal 681 are applied to the AND gate 725. Therefore, when the bit 795 is set at "L" or when the signal 681 (equivalent to the region flag) is set at "L", the output is "0" even if the bit 795 is set at "H". During this period, the writing operation is carried out for the buffer memory 720b. During the scan period, the operations are alternately carried out, and the attribute data is continuously delivered to the synthetic processing section 2.

Next, operations performed in the writing mode will be described. In this case, the signal 810 is set to "L".

With respect to the buffer memory 720a, when the selector 721a is switched to the upper side signals, the writing operations are carried out by the control signal 760a which follows the signal 803 and is synchronous with the signal X$_S$. The address is the output of a counter 730, and the data 794 is delivered from the synthetic processing section 2. During the period when the region flag is set at "H", the data is continuously stored in the buffer memory 720a from the 0-th address. In the next scan phase, the selector 721a is switched to the lower side signals. In this case, the address signal is the output 793 of the counter 729, and the writing signal 766 is set at "L" at all times. At the start of the line scan phase, the address 763a is 0, and the content of the 0-th address, or the first data, is applied through the selector 723 to the input section of the register 727. In this situation, q$_B$' and p$_B$' are arranged in the scanning control device 60. When a request signal 684 is raised to "H", the first data is latched by the register 727 and is supplied to the data line 792 because the gate 724 has been opened.

Thereafter, the data writing request is accepted by the region information source 4, q$_B$' and p$_B$', and the data 793 and 792 are updated simultaneously. This operation is continued until the generation of the request signal 791 is suspended.

An example of the synthetic processing section 2 is described below with reference to FIG. 10. As mentioned earlier, the synthetic processing section 2 comprises a synthesizing device for producing local data of the synthetic regions. Part of the synthesizing device is formed of an AND array S10 and an OR array S20 which perform logical operations on the region flags 990 and produce output sigals which are region flags or condition flags of the synthetic regions. An attribute data processing unit S40a adapted to carry out a predetermined process associated with single or plural condition flags, attribute information 794 is connected to the unit S40. One of the output of the unit S40a is directly outputted as S41a which forms attribute information concerning the synthetic region, and another is delivered, as the updating data of distributed attribute information, to the region information source 4 via the surveying device 3, as indicated by S41Z.

In the AND array S10 and OR array S20, the intersection connection is dynamically changed as described later. A register (S101) adapted to store, by being preset, the connection condition is provided in the array unit. In the arrays, fixed condition lines are provided, and a register (S100) is preset for this purpose.

The circuitry of the AND and OR arrays S10 and S20 is similar to that of a programmable logic array. In the AND array S10, the input line for the signal 990 and the term lines S11 form an array. With the intersection connection pattern determined properly, the intended results of AND operation between the appointed elements of the signals 990 are realized on the product term lines S11. The term lines S11 feeds the OR array. In this system, the intersection connection is dynamically controlled. The arrangement of the AND array S10 is similar to that of the OR array S20. Therefore, typically, the AND array S10 will be described.

Figure 11:
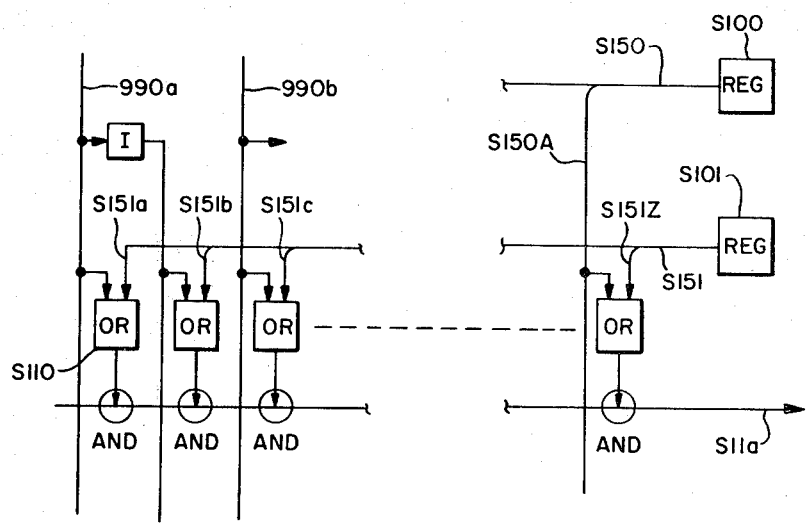
FIG. 11 shows a part of the AND array S10.

FIG. 11 shows intersections on one of the term lines S11a of the AND array S10. The input signals 990a and 990b indicate region flags, and form a pair with inverted signals thereof. For instance, the input line for 990a is AND-connected (as in the wired AND of an open collector TTL gate) to the term line S11a through an OR gate S110. Another input line for the signal S151a of the OR gate is an intersection control line. When this line is set at "H", this intersection is placed in a "don't care" state. A register S101 is used to hold the control data of the intersections on the line S11a. The output S150 of a register S110 indicates the fixed conditions, and is handled similarly as in the line 990a.

Figure 10:
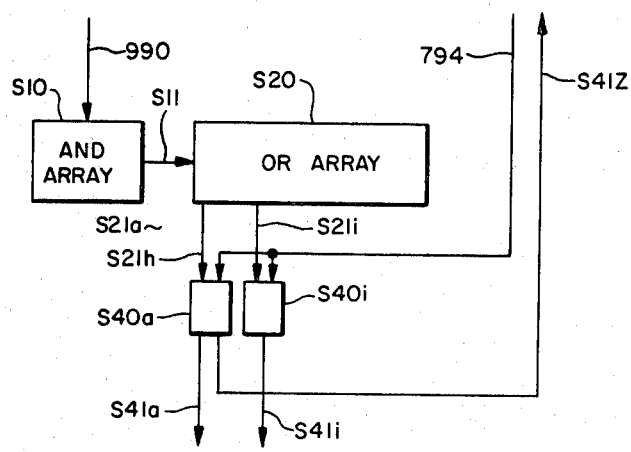
FIG. 10 shows the arrangement in the synthetic processing section 2.

As shown in FIG. 10, attribute data processing unit S40a performs processing, according to a preset condition, and utilizing condition flags outputted by the OR array, and the attribute information 794.

FIG. 12 shows another example of the attribute data processing unit S40i comprising a summarizing device in the form of a counter S430 used for measurement of the area of a synthetic region. Reference character S600 designates a fundamental clock signal for a current scan, and corresponds to 803 in the region information unit processing section. Reference character S601 designate a plane scan phase signal. A condition flag is applied to one input terminal of an AND gate S431. Therefore, only when the condition flag is set at "H", is the clock pulse S435 applied to the count-up input of the counter S430. A signal obtained by inverting the signal S601 is used as the clear signal of the counter S430, and as the clock signal of a register S432.

At the start of the plane scan, the output S41i is zero. Thereafter, during the period in which the condition flag is set at "H", the number of clock pulses is counted, and the pulse count is finally set in the register S432 at the end of the plane scan. That is, this is the area of the composite region indicated by the condition flag. Through this operation area of the region is measured.

In the attribute data processing unit S40a in FIG. 10, a plurality of condition flag lines are provided, and two kinds of output, direct output and distributed attribute updating output, are provided. This will be described in detail with reference to FIG. 13, in which data on eight new regions are controlled. For the purpose of picture control, the object scene is divided into the elements which are managed independently; the term "display unit" is used to refer to such elements.

Among the display units, one display unit has a distributed attribute, and is outputted by an output port P0. This display unit expresses an optional picture which can be expressed in a predetermined region. The remaining display units express patterns having uniform color and brightness. Five, output ports P3–P7, of these seven display units have non-transparency. Among them, a plurality of units are not displayed simultaneously.

Eight lines for condition flag S21a–S21h are provided as input lines. At first, for simplification in description, the effect of AND and OR arrays will be neglected, or the description will be made with reference to the case where the intersection of the AND and OR arrays are controlled so that one region flag corresponds to one condition flag. Therefore, each condition flag corresponds to one surveying device. When the scanning coordinate is inside of assigned region, the flag is raised to "H". Each region is independently controlled, and the position and size can be freely changed. Accordingly, sometimes, a plurality of display units are simultaneously placed in "inside" state. As this unit S40a handles a display unit having non-transparency, it is necessary to determine the upper and lower relationship between these display units. This will be achieved by a priority control device including a priority encoder S441 and a decoder S442 as will be fully described below. In the unit shown in FIG. 13 S21h designates a flag for the upper-most display unit, and S21a designates a flag for the lower-most display unit. As these flags control the displaying of the above-described display units, where there are a plurality of flags simultaneously at "H", the upper-most one of non-transparent display units there, will be displayed and the transparent display units above it must be displayed but all units lower than it should not be displayed.

The condition flags and S462 are applied to an AND gate S440. Signal S462 has eight bits similarly as in the signal S21, bits of the signal S462 which corresponds to non-transparent display unit have been set to "1". Accordingly, the output of the S440 indicates the region state of the non-transparent display units only.

Next, the output is encoded by the priority encoder S441, assuming that the S21h is highest order data to produce an ouptut S31 which is the encoded region flag. The output is then decoded by the decoder S442. Accordingly, the bit which is at "1" in the output data corresponds to upper-most one among the non-transparent display units at that time. The output S469 of the priority encoder S441 is set at "1" when its input has at least one "1" bit. This output S469 is employed as the enable input of the next decoder S442. Therefore, when no "1" bit is provided, the outputs of the decoder are all set at "0".

The output of the decoder S442 is shifted by one bit towards the least significant bit (left) before being applied to an adder S443. That is, the bit for the lower-most unit S21a is lost by the shift, and instead "0" is provided for the position of the upper-most display unit. All the bits of S463 are set at "1".

This addition is carried out with the bit for lower-most display unit as the MSB. At result, it forms a mask pattern for the condition flag, and is applied to an AND gate S444 with the condition flag as another input. The output S466 of the gate S444 is the modified condition flag, the display units which correspond to "1" bit in the output is displayed at this time.

This will be further described with reference to an example.

|  | a | b | c | d | e | f | g | h |  |
|---|---|---|---|---|---|---|---|---|---|
| S21a–S21h | 1 | 0 | 1 | 0 | 1 | 0 | 0 | 1 |  |
| S462 | 1 | 1 | 0 | 1 | 1 | 0 | 1 | 0 | (non-transpar- |
| S440 output | 1 | 0 | 0 | 0 | 1 | 0 | 0 | 0 | ency flag) |
| S441 output |  |  |  |  | 4 |  |  |  |  |
| S442 output | 0 | 0 | 0 | 0 | 1 | 0 | 0 | 0 |  |
| S464(L) | 0 | 0 | 0 | 1 | 0 | 0 | 0 | 0 |  |
| S463 | 1 | 1 | 1 | 1 | 1 | 1 | 1 | 1 |  |
| S465 | 0 | 0 | 0 | 0 | 1 | 1 | 1 | 1 |  |
| S21a–S21h | 1 | 0 | 1 | 0 | 1 | 0 | 0 | 1 |  |
| S466 | 0 | 0 | 0 | 0 | 1 | 0 | 0 | 1 |  |

That is, S21e and S21a are the non-transparent display units at the display position. As S21e is superior, S21a is not outputted. On the other hand, S21h and S21f correspond to the transparent display units which is superior to S21e. As S21f is not at the display position, display is effected with S21h placed over S21e.

A signal S467 is carried on eight signal lines, to control the output ports P0 through P7. AND gates (S446 and others) are provided for the transparent output ports P0 through P2. For the non-transparent output ports P3 through P7, gate outputs make AND connection to the common line S468. As for display outputs which correspond to the region attributes, with respect to the output port P0 a distributed attribute output 794 is applied to an AND gate S446, and when S467-0 is set at "H", it is outputted, as it is, to an adder S453. When S467-0 is set at "L", it is "0", and the adder is not affected.

Reference character S447 designates a register for the output data via P1 having transparent characteristics, and the attribute data of the new region is preset. This output is applied through an AND gate S449 to the adder S453. Similarly as in the case of the output port P0, when S467-1 is set at "L", the output becomes "0". Reference character S472 designates a signal which is raised to "H" when the adder overflows. A register S448 is provided for the non-transparent output port P3. The data are outputted to the line S468 when S467-3 is set at "H". In this case, control is made so that the other output ports P4 through P7 are not opened. The line S468 is applied to one input terminal of the AND gate S452, to another input terminal of which the signal S469 is applied. When the non-transparent output exists, the signal S469 is set to "1".

Thus, the non-transparent outputs are collected, and the four outputs are subjected to two stages of addition by adders S453, S454 and S455, and the addition result S470 is applied to a selector S456. The other input S471 of the selector S456 is a singal fixed to the maximum value allowable for the output. The overflow signals from the three adders are applied to an OR gate S480. When the output S473 of the OR gate S480 is at "H", the signal S471 is selected. That is, when the result overflows, the output value is limited to the maximum. Inverted or non-inverted form of this output is selectable by a selector S457.

Where the data applied to the output ports express the density of an image, pictures drawn on ordinary sheets or transparent mediums and superposed can be reproduced by selecting the inverted signal. The outputs includes the direct output S41a to a monitor and so on and the output in order to update the distributed attribute information and they can be selected with a gate control signal. These selection signals are preset in a register S460.

Correspondence of the modified condition flag to the output port control signal S467 is determined by the switching unit S445. The data for correspondence is stored in internal registers. According to the correspondence relation, the non-transparency flag signal S462 is automatically constructed. This will become more apparent from FIG. 14. Reference characters S466a through S466h designate modified condition flags corresponding to orignal flags S21a through S21h. Typically, S466a will be described. An output port number to be controlled is set in a register S481a in advance. In this example, data in register indicates one of port numbers 0 through 7. The output of this register is inputted to a decoder S480a. The output of the decoder consists of eight lines S491a-0 through S491a-7 corresponding respectively to the output ports P0 through P7. When the value of the register is zero, S491a-0 is set to "H", when the value of the register is seven, S491a-7 is set to "H", under the condition that the modified condition flag S466a is applied, as an enable signal, to the decoder. When the correction flag is set at "L", no output is provided by the decoder.

Eight decoders S480a through S480h are provided, and accordingly, eight sets of outputs are available.

An OR gate S483 is provided to subject the outputs of the decoders to logical OR operation separately according to the output ports. That is, S491a-0, S491b-0, S491c-0 ... and S491h-0 are applied to one component of the OR gate S483, and an output S467-0 is provided thereby.

Next, the non-transparency flag is formed by comparators S482a, S482b, ... The outputs S490a, ... of the registers and a signal S493 are applied to the comparators. The port number of the non-transparent output is "3" or higher. Accordingly, if a binary value "2" is set in S493 and the outputs of the comparators are so arranged that $S462 = S490 \leq S493$, then when the non-transparent output port is specified, the flag is automatically set to "1".

In the above-description, the one to one correspondence between the region flag and the condition flag has been assumed. However, in practice, a variety of displays can be effected by utilizing the AND and OR arrays. For instance, it is assumed that there are two regions A and B, and a region where the regions A and B are overlapped outputs value c, and a part of region A or B without overlapping outputs value a or b. In this case, logical operations in the AND-OR arrays are as follows.

$S21a = A \wedge B$, $S21b = A \wedge B$, $S21c = B \wedge A$ For $S21d$ through $S21h$, "0"s are supplied by fixed condition lines. The three condition flags are originally exclusive, and therefore any one of the output ports P1 through P7 can be assigned. However, in this case, a, b and c will be assigned to P7, P6 and P5, respectively. Thus, values 7, 6 and 5 are set in the registers S481a, S481b and S481c, while c, b and a are set in the registers for P5, P6 and P7. There are two region information units, they are A and B. Then two unit processing sections are employed.

Where the processing cannot be achieved by one unit processing section because the region is intricate in configuration and has a number of border lines, the region information unit is divided into a plurality of region units, and the condition flag for the original region will be acquired at AND-OR arrays by the OR-operation on all of the region flags of divided regions. Sometimes a plurality of display units have the same outputs. In this case, the same port number is set in a plurality of registers S481. Thus, the number of output ports may be not always equal to the number of condition flags.

Figure 13:
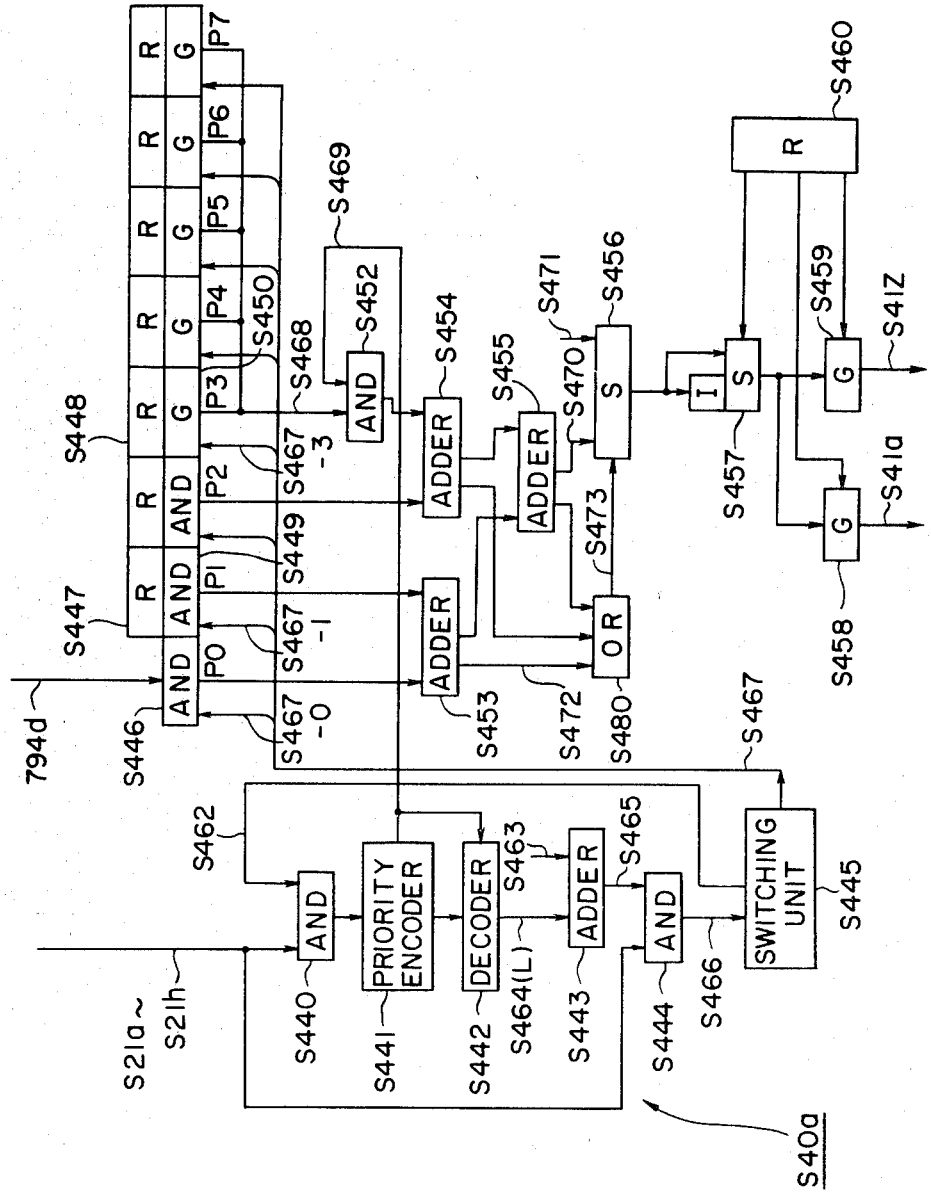
FIG. 13 shows one example arrangement of a specialized processing unit having the priority control function for graphic display S40$a$.

In FIG. 13, the number of condition flags is eight, and the number of output ports also is eight. However, it is obvious that the number can be readily increased. The non-transparent output can be increased merely by increasing the number of the combinations of registers and gates. However, in order to increase the transparent output it is necessary to increase the number of stages in addition.

In the above-described example, only one distributed attribute data is used as the transparent output, but the number and the transparency of the display units which have the distributed attribute are not restricted.

It will be appreciated that the region information processing system described above receives region information provided by external region information sources and forms new region information, which can be outputted to enable visualization of the synthetic region. The region information processing system of the above-described embodiment may find use for real time production of computer animation. In this case data concerning the elements of the picture constitutes the objective region information and the synthetic regions form a synthesized picture. The synthesized picture varies with the variation in the data concerning the elements of the picture.

In the embodiment described above, the region information sources 4 are in the form of memory devices. It should however be noted that some or all of the region information sources may alternatively comprise RADAR system. In this case, the subfield designating data supplied to the associated surveying device 3 is delivered to the RADAR system and the local data of the designated subfield is given to the surveying device 3. The local data reflects the state of the actual scene as detected by the RADAR system. The region information sources may still alternatively comprise television cameras.

It should also be noted that it is possible to provide a variety of systems which have different characteristics by means of combining the synthetic processing sections and the surveying device having the above-described functions and arrangements. For instance, a figure measurement device may be formed. In this case, a digital electronic computer may be employed as the synthetic processing section. The surveying devices of the type which receives region information from optical means which reads a figure to be measured is employed. The output of the optical means is "H" for the inside of the figure by setting a threshold value in the reading device. Alternatively, when the object is expressed as an outline of region the figure is read as a line, so that the output signal level is changed whenever the optical means scans a part of the line. In the synthetic processing section, the maximum and minimum coordinates with respect to two orthogonal axes can be determined in one frame from the information about the scanning coordinate and the inside and outside of the region which change with time; the area can be determined by integrating the number of scanning points indicating the region inside; the figure center position and the moment of inertia of the area around the figure center can be determined by calculating the moment and the moment of inertia of area from a particular axis, and the principal axis can be determined by repeating the above-described measurements while the object is turned. In addition, calculation of any portion of overlapped figure and calculation of the characteristic value as a whole of plural figures can be effected.

It has been assumed that the regions whose information is to be processed and the field in which the regions are positioned are two-dimensional, but the present invention is also applicable to regions and a field having more than two dimensions.

What is claimed is:

1. A region information processing system for processing information concerning a plurality of objective regions in a field to produce information concerning at least one synthetic region to be formed by combining by synthesis the information concerning each of the objective regions being provided by external region information source means, the region information processing system comprising:
   (a) subfield designating means for sequentially designating subfields each constituting part of the field, by providing, one at a time, subfield designating data,
   (b) a plurality of surveying means each associated with a corresponding one of the regions and each responsive to the subfield designating data for examining the region information source means to produce local data of the subfield being designated concerning the associated region, the local data including at least region flag data indicating whether or not the subfield is inside the boundary of the associated region, and
   (c) synthesizing means responsive to the local data of the subfield concerning the objective regions for producing local data of the synthetic region including at least region flag data indicating whether or not the subfield being designated is inside the synthetic region, said synthesizing means judging whether or not the local data of the subfield concerning the objective regions satisfy a predetermined condition to determine depending on the result of the judgement, the significance of the region flag data of the synthetic region.

2. A region information processing system according to claim 1, wherein each of the surveying means is capable of producing the local data of any of the subfields designated by the subfield designating means.

3. A region information processing system according to claim 1, wherein the synthesizing means is adapted to combine by synthesis the local data of the subfield concerning the objective regions to produce attribute data of the subfield concerning the synthetic region.

4. A region information processing system according to claim 1, wherein the local data produced by the surveying means further include attribute data of the subfield indicating the local attribute of the subfield.

5. A region information processing system according to claim 1, further comprising:
   (d) summarizing means responsive to the local data from the synthesizing means for producing summary information concerning the synthetic region.

6. A region information system according to claim 1, wherein
   the subfield designating means is adapted to designate the subfields following a scanning path in such an order that the subfields adjacent to each other are designated consecutively, the region information source means is adapted to provide region boundary position data indicative of the position of the boundary, and
   at least one of the surveying means is adapted to receive the region boundary position data and to determine, based on the region boundary position data and the subfield designating data, whether or not the subfield being designated is inside the boundary of the associated region and to produce data indicative of the result of the determination and to form the region flag data of the subfield of the associated region which is being designated.

7. A region information processing system according to claim 6, wherein the subfield designating means is adapted to designate the subfields in a predetermined order, and wherein the surveying means which receives the region boundary position data comprises:
   a cross point determining means which is responsive to the region boundary position data for determining the subfield containing a cross point between the boundary and the scanning path and to produce cross point data indicative of the subfield containing the cross point, a cross detecting means which is responsive to the cross point data and the subfield designating data for producing a cross signal when the subfield containing the cross point is designated, and a register means for storing the region flag data of the subfield of the associated region and which is responsive to the cross signal for inverting the significance of the region flag data upon receipt of each cross signal, the region flag data stored in the register means forming an output of a surveying means, said surveying output being supplied to the synthesizing means.

8. A region information processing system according to claim 7, wherein the cross detecting means comprises:
   a buffer for storing the cross point data in the order in which the subfields containing the respective cross points are designated, and
   means responsive to the cross point data for writing in said buffer cross point data in the above-mentioned order, and
   means responsive to the subfield designating data for accessing said buffer and for determining whether the subfield containing the cross point is designated and for producing a cross signal when the subfield containing the cross point is found to be designated.

9. A region information processing system according to claim 1, wherein the synthesizing means comprises means for producing region flag data concerning a plurality of synthetic regions each indicating whether or not the subfield being designated is inside the synthetic region.

10. A region information processing system according to claim 9, wherein the synthesizing means further comprises priority control means responsive to more than one of the region flag data for selecting, according to preset priority, one of the region flag data indicating that the subfield being designated is inside the respective synthetic regions to invert the significance of the unselected region flag data.

11. A region information processing system according to claim 1, further comprising a means for supplying the data produced by the synthesizing means to the region information source means for use as region information.

* * * * *